US009198452B2

(12) United States Patent
Mutsaers et al.

(10) Patent No.: US 9,198,452 B2
(45) Date of Patent: Dec. 1, 2015

(54) PROCESS FOR FOOD PRODUCTION

(75) Inventors: Johanna Henrica Gerdina Maria Mutsaers, Den Hoorn (NL); Thibaut José Wenzel, Leiden (NL); Lex De Boer, Wateringen (NL); Albertus Alard Van Dijk, Vlaardingen (NL); Rutger Jan Van Rooijen, Ede (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 13/560,502

(22) Filed: Jul. 27, 2012

(65) Prior Publication Data

US 2012/0288919 A1   Nov. 15, 2012

Related U.S. Application Data

(63) Continuation of application No. 10/584,921, filed as application No. PCT/EP2005/000442 on Jan. 13, 2005, now abandoned.

(30) Foreign Application Priority Data

Jan. 13, 2004   (EP) .................................... 04075123

(51) Int. Cl.
| | |
|---|---|
| C12Q 1/54 | (2006.01) |
| A23L 1/27 | (2006.01) |
| A21D 8/04 | (2006.01) |
| A23C 19/032 | (2006.01) |
| C11D 3/386 | (2006.01) |
| C11D 3/40 | (2006.01) |

(52) U.S. Cl.
CPC . *A23L 1/27* (2013.01); *A21D 8/042* (2013.01); *A23C 19/0328* (2013.01); *C11D 3/386* (2013.01); *C11D 3/40* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 1,957,335 A | 5/1934 | Haas | |
| 3,843,801 A | 10/1974 | Efthymiou | |
| 4,888,184 A | 12/1989 | Bottomley et al. | |
| 6,120,820 A | 9/2000 | Brody et al. | |
| 6,465,410 B1 | 10/2002 | Bettiol | |
| 7,981,636 B2 * | 7/2011 | Zorn et al. | 435/69.1 |
| 2006/0127533 A1 * | 6/2006 | Roos et al. | 426/42 |

FOREIGN PATENT DOCUMENTS

| | | |
|---|---|---|
| EP | 0 282 663 A | 9/1988 |
| EP | 1 031 627 A | 8/2000 |
| JP | 61-257158 | 11/1986 |
| JP | 04-084848 | 3/1992 |
| JP | 09-172944 | 7/1997 |
| WO | WO 02/20755 A2 | 3/2002 |
| WO | WO 02086114 A1 | 10/2002 |
| WO | WO 2005004616 A1 | 1/2005 |

OTHER PUBLICATIONS

Zorn ( Applied Microbiology and Biotechnology 62:331-336, 2003).*
Kang et al. (J. Dairy Sci., vol. 93, 3891-3901, 2010).*
International Search Report dated Jul. 14, 2005 issued in connection with PCT/EP2005/000442.
Database XP002286712 & JP 53 062846, Jun. 5, 1978.
Zorn et al, "Cleavage of beta, beta-carotene to flavor compounds by fungi", Applied Microbiology and Biotechnology, vol. 62, No. 4, Sep. 2003, pp. 331-336.
Gelinas et al, "Oxido-reductases and lipases as dough-bleaching agents", Cereal Chemistry, American Association of Cereal, Chemist, Minneapolis, US, vol. 75, No. 6, Nov. 1998, pp. 810-814.
1795-1895 One Hundred Years of American Commerce, Depew, Chauncey M., editor, D.O. Haynes & Co., New York, 1895, p. 304.
US Dairy Export Council, Whey Products in Baked Goods, [on line] 1999 no month, [retrieved Jun. 25, 2011]. Retrieved from the Internet: URL: <http://www.usdec.org/files/Publications/1BAKery.pdf>.
US Department of Agriculture, Forgein Agricultural Service, US Whey Exports, [on line] May 2003, [retrieved Jun. 25, 2011]. Retrieved from the Internet: URL: <http://www.fas.usda.gov/dlp2/circular/1999/99-12Dairy/uswhey.html>.
Davisco Foods Internationa, Whey Proteins—Nutritional and Functional Ingredients for Ice Cream [online] Jun. 2003, [retrieved Jun. 25, 2011]. Retrieved from the Internet: URL: <http://www.daviscofoods.com/whoweare/cmn.cfm>.
Schulthess et al "Improving durum wheat (Triticum turgidum L. var durum) grain yellow pigment content through plant breeding" Cien. Inv. Agr. 40(3):475-490, 2013.

\* cited by examiner

*Primary Examiner* — Hope Robinson
(74) *Attorney, Agent, or Firm* — Nixon & Vanderhye P.C.

(57) ABSTRACT

The present invention relates to a process for the production of a food product whereby an intermediate form of said food product comprises a pigment, which process comprises adding at least one enzyme that is effective in directly converting said pigment into a form which results in increasing the whiteness of at least part of the food product compared to the food product for which said enzyme is not added during its production. The invention also relates to food products obtained from the process of the invention.

12 Claims, No Drawings

PROCESS FOR FOOD PRODUCTION

This application is a continuation of U.S. application Ser. No. 10/584,921, filed Jun. 29, 2006, which is the U.S. national phase of international application PCT/EP2005/000442, filed Jan. 13, 2005 which designated the U.S. and claims benefit of EP 04075123.2, filed Jan. 13, 2004, the entire contents of which are hereby incorporated by reference.

The present invention relates to a method for preparing a food product having increased whiteness, and the food product obtained.

In some types of food product a white colour of at least part of the food product is seen as desirable, for example in dairy products, for example cheeses, whey, butter, and milk powder and in flour-based products, for example bread and noodles.

The raw materials or intermediate products of such food products however may comprise pigments, which can cause off-white to yellow colour of the food product. Examples of such pigments are carotenoids (carotenes and xanthophylls) and flavones.

In white bread for example, a white crumb is seen as 6 desirable property. A whiter crumb may be obtained by using enzymes such as catalase, peroxidase, lipase and/or lipoxygenase, see for instance '*Oxido-reductases and Lipases as Dough-Bleaching Agent*' by P. Gélinas et al, Cereal Chem, 75(6), 810-814 (1998). All enzymes mentioned have a bleaching effect on the crumb. At present, the baking industry mostly uses enzyme active soy flour, which contains lipoxygenases. The lipoxygenases in the soy flour are capable of bleaching wheat flour pigments as a result of the action of free radicals and other reactive oxygen species that are formed during the oxidation of fatty acids by lipoxygenase. This reaction is called a co-oxidation. In soy flour, three lipoxygenases are present, L1, L2 and L3 whereby L2 and L3 possess the best bleaching activity (W. Grosch, G. Laskawy and F. Weber, J. Agric. Food Chem 24 (1976), 456). Soy flour not only contains lipoxygenases but also the fatty acids that are necessary for the bleaching effect, resulting in an improved bleaching effect.

A disadvantage associated with the use of soybeans as a source of lipoxygenase, is the fact that nowadays most of the soybeans are genetically modified (GMO). Since there is a worldwide consumer preference for using non-GMO derived bread improving additives, an alternative for the soy lipoxygenases is highly required. The known enzymes other than the lipoxygenases L2 and L3 from soy have the disadvantage that their performance is not as good as the lipoxygenases from soy. In practice, to obtain the desired whiteness, these enzymes are to be combined with cofactors or other enzymes to reach the desired level of whiteness of the crumb. Peroxidases catalyze non-enzymatically the oxidation, by molecular oxygen, of unsaturated compounds e.g. unsaturated fatty acids. (C. E. Eriksson et. al. JAOS 48 (1971) 442). These oxidized fatty acids generate radicals that probably react with flour pigments to less coloured products in a similar way as the lipoxygenase reaction products.

It is the object of the present invention to provide a novel food product having increased whiteness of at least part of the food product. This object is reached by a novel process for the production of a food product in which an intermediate form of said food products comprises a pigment, which process comprises adding at least one enzyme that is effective in directly converting said pigment into a form which results in increasing the whiteness of at least part of the food product compared to the food product for which said enzyme is not added during its production.

Enzymes capable of directly converting pigment into a form that results in increasing whiteness are here and hereafter referred to as bleaching enzymes. These enzymes can in various ways exert their direct bleaching effect on the pigments. For example, they can directly convert the pigments by saturating unsaturated bonds in the pigments via for example hydrogenation, or they can directly cleave the pigments, forming degradation products. With the term direct is meant that these enzymes act upon the pigment as substrate itself. Use of co-factors for reaching the conversion is not specifically excluded.

Enzymes capable of directly cleaving pigments will here and hereafter are referred to as cleaving enzymes. Suitable cleaving enzymes according to the invention are enzymes that are capable of cleaving carotenoids (carotenes and xanthophylls) and flavones. Carotenoids can be cleaved in two different ways, central and eccentric. Central cleavage of carotenoids results in formation of retinoids ($C_{20}$-compounds). Eccentric cleavage can yield a more diverse group of compounds, as for example abscisic acid. An enzyme capable of central cleavage of carotenoids is for example (β-carotene 15,15'-monooxygenase (EC 1.14.99.36) as described in for example EP-A-1031623 and J. Lintig and K Vogt (2000) J. Biol. Chem. 275, 11915. This enzyme was formerly known as beta-carotene 15,15'-dioxygenase=EC 1.13.11.21.

An additional advantage of the use of enzymes capable of central cleavage is the formation of retinoids. These are essential components in vision. β-carotene is cleaved into two molecules of retinal. This retinal can be modified to retinol, also known as vitamin A. Examples of enzymes capable of eccentric cleavage of carotenoids are 9-cis-epoxycarotenoid dioxygenase (e.g. X. Qin and J. A. D. Zeevaart (1999), Proc. Nat. Acad. Science, 96, 15354) and β-carotene 9',10'-dioxygenase (e.g. Kiefer et al. (2001), J. Biol. Chem. 287, 14110).

An intermediate form of the food product is defined herein as any form that occurs during the production process prior to obtaining the final form of the food product. The intermediate form may comprise the individual raw materials used and/or mixture thereof and/or mixtures with additives and/or processing aids, or subsequently processed form thereof.

The enzyme is added in effective amounts. The skilled person can easily determine this effective amount by varying the enzyme dosage and measuring the degradation of pigments and/or the increased whiteness of the final food product. In case the enzyme is capable of converting beta-carotene, the effective amount of enzyme may be expressed in terms of beta-degrading units (e.g. Aziz or Zorn units—see Materials and Methods)

The food product may be made from at least one raw material that is of plant origin, such as wheat flour. The latter is known to contain pigments such as carotenoids (carotenes and xanthophylls) and flavones, which are responsible for, for example, the crumb colour of baked bread. Alternatively, these pigments may originate from other sources than plant raw materials e.g. from milk. Examples of carotenoids are further substances with a carotene backbone, in particular with a beta-carotene or capsanthin backbone, more particularly alpha- and beta-carotene, lutein, lycopene, antheraxanthin, capsanthin, zeaxanthin, violaxanthin, astaxanthin, canthaxanthin, luteoxanthin, neoxanthin, and the respective apo-carotenoids.

A preferred food product for the process according to the invention is baked bread and other baked products from wheat flour and/or flours from other cereal origin.

For example, for the baked food product bread, the intermediate forms comprise for example wheat flour, the initial mixture thereof with other bread ingredients such as for example water, salt, yeast and bread improving compositions, the mixed dough, the kneaded dough, the leavened dough and the partially baked dough. In case the enzyme is capable of converting beta-carotene, the enzyme is added to the wheat flour and/or flours from other cereal origin or to any initial mixture with other bread ingredients, in an amount so as to give between 1 and 5000 Zorn units per kg flour, preferably between 5 and 1000 Zorn units per kg flour, more preferably between 10 and 500 Zorn units per kg flour and most preferably between 25 and 250 Zorn units per kg flour. The enzyme may also be added together with or as part of a bread improver mixture with other dough and/or bread improving processing aids known in the art, such as one or more enzymes known in the art (e.g. amylolytic enzymes such as alpha-amylase, beta-amylase, amyloglucosidase, anti-staling maltogenic alpha-amylase, lipolytic enzymes such as lipase, phospholipase, galactolipase, oxidizing enzymes such as glucose oxidase, hexose oxidase, laccase, pyranose oxidase, carbohydrate oxidase, hemicellulolytic enzymes such as xylanase, arabinofuranosidase, cellulolytic enzymes such as endo-glucanases (such as cellulases), cellobiohydrolases, proteases and/or chemical processing aids known in the art such as reducing and oxidizing agents (e.g. ascorbic acid, glutathione), emulsifiers (e.g. DATEM) etceteras.

In some types of noodles, a white product is seen as desirable. For example, for noodles, the intermediate forms comprise for example wheat flour, the initial mixture thereof with water, salt, and other noodle ingredients, the mixed dough and the final noodle product that can be fresh, dried, boiled, steamed and/or fried.

The food product can also be a dairy product. By dairy products is meant products that contain at least 10 wt %, preferably at least 30 wt %, more, preferably at least 50 wt %, still more preferably at least 70 wt % or most preferably at least 80 wt % on dry solid basis of components originating from milk, preferably cow's milk. Components originating from milk are for example fats, proteins, for example whey cheese curd and casein, etc. Milk, especially cow's milk, may naturally contain colouring compounds such as carotenoids, for example beta-carotene.

Whiteness plays an important role in for example cheese, butter oil, milk powder or whey products. For example for cheeses like Feta, Mozzarella, Ricotta and blue cheese, for example Danish Blue, Roquefort or Gorgonzola, whiteness is considered desirable. In cheeses wherein milk from goat or sheep is at least partially replaced by cow's milk, the whiteness of the cheese might be a problem because of the β-carotene that is present in cow's milk.

For some cheeses natural colouring agents like annatto or beta-carotene are used as food colouring agents. However, this colouring agent will also be present in the whey. When this whey is further processed into for example baby formula, the colbur of the whey product may be undesirable. For the food product soft cheese, the intermediate products comprise e.g. milk, and cheese curd.

The enzyme may be added as an enzyme preparation or produced in situ by a microorganism capable of producing said enzyme. The enzyme preparation can be derived from various sources, for example from plants, animals and microorganisms. Preferably the enzyme preparation is derived from a microorganism, since microorganisms make it possible to obtain the enzyme on an industrial scale in a controlled manner. The enzyme preparation derived from a microorganism can be obtained by classical fermentation processes of a selected microbial strain or by fermentation of a microorganism that over expresses the enzyme. The microorganism may be a bacterium, a fungus or yeast. Examples of suitable microorganisms are *Microcystis*, *Lepista*, for example *L. Irina*, *Cyathus*, for example *C. pallidus*, *Ganoderma*, for example *G. applanatum*, *Ischnoderma*, for example *I. benzoinum*, *Marasmius*, for example *M. scorodonius*, *Trametes*, for example *T. suaveoluens* of *T. versicolour*, *Cryptococcus*, for example *C. laurentii*, *Hypomyces*, for example *H. odoratus* or *Phaffia*, for example *P. rhodozyma*, *Phanerochaete* for example *P. chrysosporium*, *Lentinula* for example *L. edodes*, *Coprinus* for example *C. cinereus*, *Gloeophyllum* for example *G. trabeum*, *Ophiostoma* for example *O. piliferum*, *Aspergillus* for example *A. niger*, *A. oryzae*, *A. nidulans*, *Thermomyces*, for example *T. lanuginosa*, *Sporotrichum*, for example *S. thermophile*, *Aureobasidium* for example *A. pullulans*, *Amorphotheca*, for example *A. resinae*, *Leucosporidium*, for example *L. scottii*, *Cunninghamella*, for example *C. elegans*.

Measurement of whiteness of a product can be done visually or a reflection measurement, for example by scanning. In reflection measurement the colors are quantified with three parameters: L-factor (black=0 to white=100), a-factor (green=−60 to red=+60) and b-factor (Blue=−60 to Yellow=+60). In case of carotenoids, the b-factor of the produced product is preferably as closest to 0 as possible, preferably between 10 and 0, more preferably between 5 and 0 and even more preferably lower than 1 and most preferably lower than 0.5.

In a second aspect, the invention provides a food product obtainable by the process of the invention as described hereinbefore. These food products are characterized by at least parts having significantly increased whiteness in comparison with food products obtainable by production processes that do not comprise adding one or more of enzymes capable of converting pigments in the intermediate products.

In a further aspect, the invention provides the use of enzymes capable in converting pigments for bleaching food products, for example flour-based or milk-derived products. Surprisingly, it was found that these enzymes can advantageously be used as a stain remover in household detergents. In particular, the enzymes proved very efficient in removing colored stains, for example grass stains, coffee and tea stains, from both cotton and synthetic (e.g. polyester) fabrics. Furthermore, the enzymes could also be used in enzymatic stone bleaching processes, for example by bleaching the indigo dye of blue jeans to a desired level.

Materials and Methods

Measurement of the Conversion of Beta-Carotene

Measurement of Beta-Carotene Degradation According to Aziz

Enzyme activity can be determined as beta-carotene conversion activity according to A. Ben Aziz (1971), Phytochemistry 10, 1445. One enzyme unit is defined herein as the amount of enzyme that converts 1 microgram of beta-carotene per minute min (further referred to as Aziz-unit).

Measurement of Beta-Carotene Degradation According to Zorn

The enzyme activity can also be determined as beta-carotene conversion activity according to Zorn et al (2003), Appl. Microbiol. Biotechnol. 62:331-336. One enzyme unit is defined herein as the amount of enzyme that converts 1 micromole of beta-carotene per minute min (further referred to as Zorn-unit). The assay is carried out as follows: 1.5 ml of enzyme containing sample was pre-incubated in a cuvette at 27° C. for 5 min before 100 µl of beta-carotene stock solution (see further below) was added. If necessary, the concentrated culture supernatant was diluted with a citric acid/phosphate buffer pH 5.5 (this buffer was prepared by mixing 43 ml 0.1 M citric acid with 56 ml 2 M $Na_2PO_4$ solutions). The decrease of absorbance was monitored over 15 min at 450 nm and 27° C. using a spectrophotometer in a temperature controlled cell holder. The curve was checked for linearity and the enzyme activity was calculated with the linear part of the curve according to the following equation:

$$\text{enzyme activity [mU/ml]} = (\Delta E \times V_t) \times 10^6 / (V_s \times d \times \epsilon)$$

wherein U=enzyme activity unit defined above; $\Delta E$=decrease of absorbance art 450 nm per minute; $V_t$=total volume in cuvette (ml); $V_s$=sample volume in cuvette (ml); $\epsilon$=extinction coefficient of beta-carotene which is 95,000 $M^{-1} \cdot cm^{-1}$; d=thickness of cuvette (cm)]

The Aziz enzyme unit can be converted to the Zorn unit by dividing the Aziz units with the molecular weight of beta-carotene=536.85.

Preparation of the Beta-Carotene Stock Solution

The beta-carotene stock solution was prepared as follows: 5 mg beta-carotene and 500 mg TWEEN-80 (a nonionic surfactant) were dissolved in 50 mL dichloromethane. The dichloromethane was evaporated at 40° C. and 800 mbar in a rotary evaporator. When nearly all dichloromethane was evaporated, 30 ml water was added and the residual dichloromethane was eliminated in the rotary evaporator and finally in a stream of nitrogen. The resulting solution was filtered and filled up to 50 ml with water in a graduated flask. The solution has to be stored in the cold (refrigerator) and is stable for a few days only.

Bleaching of Food Products

Bleaching was determined after extraction of carotenoids from crumb or dough as indicated by Gelinas, Cereal Chem. 75, 810-184 (1998). Carotenoids were determined via total lipids extraction from crumb of bread as indicated by Gelinas (1998).

Whiteness of a food product can be determined both visually as well as by reflection measurements. Visual inspection can be performed by comparing food products to which a bleaching enzyme is added versus a control without added bleaching enzyme. Reflection measurements can be performed by scanning the food product on a colour scanner (Hewlett Packard Scanjet ADF). These data can be analysed using the programme LabSMART (LabSMART, LLC, Logan Utah, USA).

EXAMPLE 1

Cultivation and Determination of the Activity of the Beta-Carotene Converting Enzyme Obtained from *Marasmius scorodonius*

Cultivation and determination of the activity of the β-carotene converting enzyme obtained from *Marasmius scorodonius* was carried out as described by Zorn et al. (2003). Hereto, mycelium from the culture collection of *Marasmius scorodonius* (obtainable from the Centraal Bureau voor Schimmelcultures—Utrecht, The Netherlands with deposit number CBS 850.87) was used to inoculate agar plates supplemented with emulsified beta-carotene. Incubation of the plates was performed at 24° C. for 14 days. 300 ml shake flasks containing 100 ml of standard nutrition solution (SNL, containing 30 g/liter glucose $H_2O$; 4.5 g/liter asparagine $H_2O$; 1.5 g/liter $KH_2PO_4$; 0.5 g/liter $MgSO_4$; 3.0 g/liter yeast extract; 1 ml/liter of a sterilized trace element solution containing 5 mg/l $CuSO_4*5$ aq, 80 mg/l $FeCl_3*6$ aq, 90 mg/l $ZnSO_4*7$ aq, 30 mg/l $MnSO_4*1$ aq and 40 mg/l EDTA; the pH was adjusted to 6.0 with 1 N NaOH prior to sterilization) were inoculated with mycelium and were incubated at 24° C. for 7 days in a shaking incubator at 150 rpm. The precultures were checked for the absence of microbial contaminations, homogenised by Ultra Turrax, and used to inoculate the main cultures (250 mL in 500 ml Erlenmeyer flasks). From the second day each day 2 ml samples were drawn, centrifuged to remove the mycelium and the activity was measured in a spectrophotometric assay. After 4 days cultivation, the beta-degrading activity was approximately 0.3 Zorn units per liter cell free supernatant.

EXAMPLE 2 and COMPARATIVE EXAMPLES A, B and C

Pup Loaf Baking Test

In a standard baking process pup loaves were prepared from 200 g wheat flour (a mixture of 160 g of wheat flour (KOLIBRI—Meneba, The Netherlands) and 40 gram wheat flour (IBIS—Meneba, The Netherlands)), 1.4 g FERMIPAN dry yeast (DSM Bakery Ingredients, Delft, The Netherlands), 4 g salt, 50 ppm ascorbic acid, 4 ppm fungal α-amylase BAKEZYME P500 (DSM Food Specialties, Delft, The Netherlands), 60 ppm of fungal hemicellulase BAKEZYME HS2000 (DSM Food Specialties, Delft, The Netherlands) and the amount of the beta-carotene degrading enzyme as indicated in Table 1 and 116 ml water in a pin mixer for 6 minutes and 15 seconds. The dough temperature was 28° C. Directly after mixing, the dough is divided into two pieces of 150 g each, rounded and proofed for 45 minutes in a proofing cabinet at 30° C., shaped and panned. After a final proof of 70 minutes at 30° C., the dough was baked for 20 minutes at 225° C.

After 24 hrs of storage in a closed box at room temperature the crumb quality and colour of the baked bread was evaluated by the baker; the amount of carotenoids was determined after extraction of the bread crumb as indicated in Table 2.

TABLE 1

| Enzyme dosage (expressed as Zorn units per 200 gram of flour) | | | | | |
|---|---|---|---|---|---|
| Enzyme from | Assay | Loaf A | Loaf B | Loaf C | Loaf 1 |
| Enzyme active soy flour | Aziz | — | 18.6 | — | — |
| Soy enzyme Lipoxygenase 2 | Aziz | — | — | 18.6 | — |
| *Marasmius scorodonius* | Zorn | — | — | — | 18.6 |

TABLE 2

| Carotenoid content of the loaves and visual identification | | | | |
|---|---|---|---|---|
|  | Loaf A | Loaf B | Loaf C | Loaf I |
| % Carotenoid present | 100 | 8 | 30 | 5 |
| Visual inspection | Yellowish | White | Off-White | White |

From Table 2 can be concluded that by addition of the bleaching enzymes according to the invention to the dough, carotenoids are degraded, resulting in a whiter crumb. The efficiency of the process according to the invention is better than for the used soy enzyme Lipoxygenase 2, and is at least equal to or better than the use of enzyme active soy flour.

EXAMPLE 3

Preparation of Mini Cheeses

Miniature cheeses were produced as described by Shakeel-Ur-Rehman et al. (Protocol for the manufacture of miniature cheeses in Lait, 78, (1998), 607-620). Raw cows milk was pasteurised by heating for 30 minutes at 63° C. The pasteurised milk was transferred to wide mouth plastic centrifuge bottles (200 mL per bottle) and cooled to 31° C. Subsequently, 0.72 ml of starter culture DS 5LT1 (DSM Gist B. V., Delft, The Netherlands) was added to each of the 200 ml of pasteurised milk in the centrifuge bottles and the milk was ripened for 20 minutes. Then, $CaCl_2$ (132 µL of a 1 mol·$L^{-1}$ solution per 200 mL ripened milk) was added, followed by addition of the coagulant (0.04 IMCU per ml). In case the experiment involved the use of bleaching enzyme I or II, this enzyme was added together with the coagulant.

The milk solutions were held for 40-50 minutes at 31° C. until a coagulum was formed. The coagulum was cut manually by cutters of stretched wire, spaced 1 cm apart on a frame. Healing was allowed for 2 minutes followed by gently stirring for 10 minutes. After that, the temperature was increased gradually to 39° C. over 30 minutes under continuous stirring of the curd/whey mixture. Upon reaching a pH of 6.2 the curd/whey mixtures were centrifuged at room temperature for 60 minutes at 1,700 g. The whey was drained and the curds were held in a water bath at 36° C. The cheeses were inverted every 15 minutes until the pH had decreased to 5.2-5.3 and were then centrifuged at room temperature at 1,700 g for 20 minutes. After further whey drainage the cheese bleaching was determined by scanning. Use of bleaching enzymes I and II resulted in a whiter cheese.

The invention claimed is:

1. A process for whitening whey containing annatto comprising contacting a whey containing annatto with a beta-carotene converting enzyme obtained from *Marasmius scorodonius* under conditions such that said whey containing annatto is whitened.

2. A process for the production of a food product from bleached whey, wherein said bleached whey has been produced from whey containing annatto by a process comprising the following steps:

(a) contacting the whey containing annatto with at least one beta-carotene converting enzyme that directly converts annatto to a form that results in increasing whiteness of the whey containing annatto to produce the bleached whey, wherein said at least one beta-carotene converting enzyme is added as an enzyme preparation obtained from, or is produced in situ by, a fungus that belongs to the genus *Marasmius* that produces said at least one beta-carotene converting enzyme; and (b) preparing the food product from the bleached whey resulting from step (a), said food product contains at least one of dairy or flour.

3. A process for whitening whey containing annatto comprising contacting a whey containing annatto with a peroxidase obtained from *Marasmius scorodonius* under conditions such that said whey containing annatto is whitened.

4. A process for the production of a food product from bleached whey, wherein said bleached whey has been produced from whey containing annatto by a process comprising the following steps:

(a) contacting the whey containing annatto with at least one peroxidase enzyme that converts annatto to a form that results in increasing whiteness of the whey containing annatto to produce the bleached whey, wherein said at least one peroxidase enzyme is added as an enzyme preparation obtained from, or is produced in situ by, a fungus that belongs to the genus *Marasmius* that produces said at least one peroxidase enzyme; and (b) preparing the food product from the bleached whey resulting from step (a), said food product contains at least one of dairy or flour.

5. The process of claim 2, wherein said flour is wheat flour.

6. The process of claim 4, wherein said flour is wheat flour.

7. The process of claim 2, wherein said fungus is *Marasmius scorodonius*.

8. The process of claim 4, wherein said fungus is *Marasmius scorodonius*.

9. A bleached whey produced from the process of claim 1.

10. A bleached whey produced from the process of claim 3.

11. A food product comprising the bleached whey of claim 9, wherein the food product comprises at least one of dairy or flour.

12. A food product comprising the bleached whey of claim 10, wherein the food product comprises at least one of dairy or flour.

* * * * *